US009732210B2

(12) United States Patent
Sperling et al.

(10) Patent No.: US 9,732,210 B2
(45) Date of Patent: Aug. 15, 2017

(54) METHOD FOR PRODUCING THERMOPLASTIC MOLDING COMPOUNDS WITH A HIGH GLASS FIBER CONTENT

(71) Applicant: INEOS STYROLUTION EUROPE GMBH, Frankfurt am Main (DE)

(72) Inventors: Leonie Felicitas Sperling, Mannheim (DE); Norbert Effen, Lambsheim (DE); Norbert Niessner, Friedelsheim (DE); Luc Gysels, Oostduinkerke (BE); Achim Datko, Leimen (DE)

(73) Assignee: INEOS STYROLUTION EUROPE GMBH (DE)

( * ) Notice: Subject to any disclaimer, the term of this patent is extended or adjusted under 35 U.S.C. 154(b) by 0 days.

(21) Appl. No.: 14/386,216

(22) PCT Filed: Mar. 19, 2013

(86) PCT No.: PCT/EP2013/055644
§ 371 (c)(1),
(2) Date: Sep. 18, 2014

(87) PCT Pub. No.: WO2013/139769
PCT Pub. Date: Sep. 26, 2013

(65) Prior Publication Data
US 2015/0087765 A1    Mar. 26, 2015

(30) Foreign Application Priority Data

Mar. 21, 2012    (EP) ..................... 12160487

(51) Int. Cl.
| | |
|---|---|
| *C08L 25/12* | (2006.01) |
| *C08L 27/06* | (2006.01) |
| *C08L 35/06* | (2006.01) |
| *C08L 51/04* | (2006.01) |
| *C08L 55/02* | (2006.01) |

(52) U.S. Cl.
CPC ............. *C08L 25/12* (2013.01); *C08L 27/06* (2013.01); *C08L 2205/03* (2013.01)

(58) Field of Classification Search
CPC .......... C08L 25/12; C08L 27/06; C08L 35/06; C08L 51/04; C08L 55/02
USPC .................................. 524/494, 504
See application file for complete search history.

(56) References Cited

U.S. PATENT DOCUMENTS

| | | | |
|---|---|---|---|
| 3,055,859 A | 9/1962 | Vollmert | |
| 3,951,906 A | 4/1976 | Farber et al. | |
| 2005/0215677 A1* | 9/2005 | Gaggar | C08L 69/00 524/115 |
| 2006/0094813 A1* | 5/2006 | Warth | C08L 51/04 524/494 |
| 2008/0207821 A1* | 8/2008 | Weber | C08L 25/04 524/517 |

FOREIGN PATENT DOCUMENTS

| | | |
|---|---|---|
| DE | 1260135 B | 2/1968 |
| DE | 3149358 A1 | 6/1983 |
| DE | 3227555 A1 | 1/1984 |
| EP | 0534212 B1 | 3/1993 |
| EP | 0669367 A1 | 2/1995 |
| EP | 0698637 A2 | 2/1996 |
| JP | 5695953 A | 8/1981 |
| KR | 900004674 B1 | 7/1990 |
| WO | 2006/040087 A1 | 4/2006 |
| WO | 2008/110539 A1 | 9/2008 |
| WO | 2010/130621 A1 | 11/2010 |
| WO | 2011/023541 A1 | 3/2011 |

OTHER PUBLICATIONS

International Search Report in Application No. PCT/EP2013/055644 dated Sep. 26, 2013.
International Preliminary Report on Patentability in Application No. PCT/EP2013/055644 dated Sep. 21, 2014.
Vieweg et al.: "Kunststoff-Handbuch Band V Polystyrol," Carl-Hanser-Verlag, Munchen, pp. 122-124, 1969.
Milewski et al.: "Handbook of Reinforcements for Plastics," Van Nostrand Reinholt Company Inc., pp. 233-286,1987.
Sun Guangping, "Basis of material forming technology," National Defense Industry Press (China), 2007, pp. 156-157.
English Translation of Sun Guangping, "Basis of material forming technology," National Defense Industry Press (China), 2007, pp. 156-157.

* cited by examiner

*Primary Examiner* — Ling Choi
*Assistant Examiner* — Ronald Grinsted
(74) *Attorney, Agent, or Firm* — J.A. Lindeman & Co., PLLC

(57) ABSTRACT

The present invention relates to a process for the production of thermoplastic molding compositions, in particular styrene copolymer compositions, to a process for production of these, and also to use thereof. The thermoplastic molding compositions produced by a process of the invention offer improved temperature-resistance and mechanical properties, which have better flow properties than known molding compositions.

9 Claims, No Drawings

METHOD FOR PRODUCING THERMOPLASTIC MOLDING COMPOUNDS WITH A HIGH GLASS FIBER CONTENT

The present invention relates to a process for the production of thermoplastic molding compositions, in particular styrene copolymer compositions, to a process for production of these, and also to use of these.

The production of styrene copolymer compositions with various fillers is known, and by way of example U.S. Pat. No. 3,951,906 discloses a composition with relatively high contents of glass fibers. The document U.S. Pat. No. 3,951,906 describes compositions comprising from 40 to 60% by weight of styrene-acrylonitrile copolymer (SAN), from 20 to 30% by weight of $CaCO_3$, from 20 to 30% by weight of glass fibers.

JP-A 56 095953 also concerns fiber-reinforced products of this type. A vinyl monomer, for example a styrene, or (meth)acrylonitrile is used here, in which a rubbery polymer (e.g. a nitrile rubber) is dissolved, or at least two copolymerizable vinyl monomers, in which the rubber polymer is dissolved. The components are then polymerized in the presence of comminuted glass fiber strands.

WO 2011/023541 discloses styrene-acrylonitrile compositions with glass fibers. The document relates to processes for the production of thermoplastic molding compositions comprising from 40 to 93.8% by weight of one or more styrene-acrylonitrile copolymers which comprise no maleic-anhydride-derived units, with intrinsic viscosity IV less than or equal to 70 ml/g (measured in accordance with DIN 53727 at 25° C. on a 0.5% by weight solution in dimethylformamide), as component A, from 0.1 to 20% by weight of one or more compatibilizers as component B, and also from 1 to 50% by weight of glass fibers as component C, and also from 0.1 to 10% by weight of one or more flow improvers as component D, and also from 5 to 50% by weight of a rubber as component E, and optionally from 0 to 49% by weight of additional substances as component F, where the respective % by weight values are based on the total weight of components A to F.

The document KR 900004674 describes the production of SAN comprising glass fiber in the presence of styrene copolymer comprising maleic acid. However, the quantity of glass fiber is restricted to at most 40% by weight. KR 900004674 also describes a glass fiber-reinforced styrene-acrylonitrile resin composition which comprises from 60 to 95% by weight of the copolymer, comprising from 60 to 80% by weight of aromatic vinyl monomer and from 20 to 40% by weight of vinyl cyanide monomer, from 5 to 40% by weight of a glass fiber with a discontinuous phase, the surface of which was treated with an aminosilane-based coupling reagent, and from 0.1 to 10% by weight of styrene-maleic anhydride copolymer, comprising from 7 to 20% by weight of maleic anhydride.

WO 2008/110539 describes fiber-composite materials comprising from 15 to 95% by weight, based on the weight of the fiber-composite material, of a thermoplastic matrix M, comprising from 0 to 99% by weight, based on the weight of the thermoplastic matrix M, of a styrene-acrylonitrile copolymer and/or of an α-methylstyrene-acrylonitrile copolymer as component A, and also from 1 to 100% by weight, based on the weight of the thermoplastic matrix M, of a styrene-acrylonitrile-maleic anhydride copolymer and/or of an α-methylstyrene-acrylonitrile-maleic anhydride copolymer as component B, and also from 0 to 50% by weight of an elastomeric polymer as component C, and also from 0 to 50% by weight, based on the weight of the thermoplastic matrix M, of additional substances conventionally used in plastics as component D, where the entirety of components A, B, C, and D gives 100% by weight, and from 5 to 85% by weight, based on the weight of the fiber-composite material, of glass fibers G, where the entirety of the thermoplastic matrix M and of the glass fibers G gives 100% by weight, and also processes for the production of fiber-composite materials.

These known teachings provide access to polymer compositions which comprise glass fibers and which exhibit good quality in terms of flow and of impregnation but by way of example, because of low rubber content, low molecular weight of the styrene-acrylonitrile copolymers, or low glass fiber length, do not provide an ideal level of toughness, or else polymer compositions which exhibit good adhesion between fiber and matrix and relatively high toughness, but as a consequence of restricted flowability permit only incomplete fiber impregnation and have poor further-processability, and in particular exhibit a relatively high level of fiber abrasion during subsequent pneumatic delivery or metering.

There is therefore a requirement for suitable thermoplastic molding compositions with a relatively high level of temperature-resistance and mechanical properties, which particularly have better flow properties than known molding compositions, in particular during further processing to give moldings, for example window profiles.

It is therefore an object of the present invention to provide thermoplastic molding compositions, in particular styrene copolymer compositions, with improved temperature-resistance and mechanical properties, which have better flow properties than known molding compositions.

The object is achieved via provision of a thermoplastic molding composition comprising:
A) from 40 to 55% by weight of a styrene-acrylonitrile copolymer and/or of an α-methylstyrene-acrylonitrile copolymer as component A,
B) from 0 to 40% by weight of a graft polymer as component B comprising:
  B1: a graft base composed of an alkyl acrylate, of an allyl (meth)acrylate, of a copolymerizable monomer, and/or of a diene monomer,
  B2: at least one graft shell composed of at least one vinylaromatic monomer and/or copolymerizable monomer,
C) from 0.1 to 10% by weight of a compatibilizer as component C,
D) from 40 to 55% by weight of glass fibers as component D,
E) from 0 to 10% by weight of other components,
where the entirety of components A, B, C, D, and E preferably gives 100% by weight.

The invention also provides a thermoplastic molding composition comprising:
A) from 40 to 50% by weight of a styrene-acrylonitrile copolymer and/or of an α-methylstyrene-acrylonitrile copolymer as component A,
B) from 0 to 15% by weight of a graft polymer as component B comprising:
  B1: a graft base composed of an alkyl acrylate, of an allyl (meth)acrylate, of a copolymerizable monomer, and/or of a diene monomer,
  B2: at least one graft shell composed of at least one vinylaromatic monomer and/or copolymerizable monomer,
C) from 0.5 to 8% by weight of a compatibilizer as component C, D) from 40 to 50% by weight of glass fibers as component D, E) from 0.1 to 4% by weight of stabilizer(s) as component E, where the entirety of components A, B, C, D, and E (preferably) gives 100% by weight.

It is preferable here that component A is an SAN copolymer, that component B is a graft copolymer with styrene and acrylonitrile, and also with a polybutadiene or acrylate rubber, and that component C is an S/AN/MA copolymer.

The invention moreover also provides a thermoplastic molding composition comprising:

A) from 40 to 50% by weight of a styrene-acrylonitrile copolymer as component A, C) from 0.5 to 8% by weight of another copolymer as compatibilizer as component C, D) from 40 to 50% by weight of glass fibers as component D, E) from 0.1 to 4% by weight of stabilizer(s) as component E, where the entirety of components A, C, D, and E gives 100% by weight.

It is preferable here that component A is an SAN copolymer and that component C is an S/AN/MA copolymer.

The invention also provides a thermoplastic molding composition comprising (or consisting of):

A) from 45 to 52% by weight of a styrene-acrylonitrile copolymer and/or of an α-methylstyrene-acrylonitrile copolymer as component A, C) from 1 to 5% by weight of a copolymeric compatibilizer, comprising a styrene-acrylonitrile-MA copolymer, as component C, D) from 45 to 55% by weight of glass fibers as component D, E) from 0.5 to 5% by weight of at least two stabilizers.

The invention also provides a thermoplastic molding composition where the length of the glass fibers (component D) is 50 mm, often less than 20 mm, often less than 10 mm. In the finished molding composition, the length of the glass fibers after extrusion is often in the range from 0.1 to 1 mm, often from 0.2 to 0.9 mm.

The invention also provides a thermoplastic molding composition where component A is a styrene-acrylonitrile copolymer with from 65 to 76% by weight styrene content and with from 35 to 24% by weight acrylonitrile content.

The invention also provides a thermoplastic molding composition where component C is composed of one or more copolymers, where component C comprises at least one styrene-acrylonitrile-maleic anhydride copolymer, where this comprises from 0.5 to 5% by weight of maleic-anhydride-derived units.

The invention also provides a thermoplastic molding composition where this comprises, as component E, from 0.05 to 5% by weight of at least two stabilizers. A combination of two (or three) stabilizers has proven to be advantageous.

The invention also provides a thermoplastic molding composition where this comprises, as additional component E, a lubricant and a (medicinal) white oil.

The invention also provides a thermoplastic molding composition where from 20 to 60% by weight of component A in the molding composition has been replaced by polyvinyl chloride (component A').

The invention also provides a process for the production of the thermoplastic molding composition comprising:

A) from 40 to 55% by weight of a styrene-acrylonitrile copolymer and/or of an α-methylstyrene-acrylonitrile copolymer as component A, B) from 0 to 40% by weight of a graft polymer as component B comprising:
  B1: a graft base composed of an alkyl acrylate, of an allyl (meth)acrylate, of a copolymerizable monomer, and/or of a diene monomer,
  B2: at least one graft shell composed of at least one vinylaromatic monomer and/or copolymerizable monomer, C) from 0.1 to 10% by weight of a compatibilizer as component C, D) from 40 to 55% by weight of glass fibers as component D, E) from 0 to 10% by weight of other components, where the entirety of components A, B, C, D, and E gives precisely 100% by weight, by mixing the components in the melt. Corresponding processes can be used for the preferred molding compositions. The abovementioned preferred quantity ranges also apply to the preferred production process.

The invention also provides the use of the thermoplastic molding composition as described above for the production of window profiles, door profiles, leaf profiles, or frame profiles. It also provides a window profile, door profile, leaf profile, or frame profile comprising a thermoplastic molding composition as described above, and a thermoplastic molding composition obtainable by the process described.

Another feature of the molding composition of the invention is that this exhibits:
  a) stiffness of more than 12 GPa, measured in the ISO 527 tensile test,
  b) linear coefficient of thermal expansion α of <50· $K^{-1}10^{-6}$ mm/m,
  c) a heat transfer coefficient A that is at least 50% smaller than that of steel.

The molding composition of the invention is moreover processable via thermoplastic processing at temperatures <300° C., and can be bonded via thermal welding, hot-plate welding, or microwave welding to other thermoplastics. It is also possible to coextrude the SAN molding composition described above with other thermoplastics, e.g. PVC. The combination of the abovementioned SAN molding compositions with PVC (e.g. molding compositions produced via coextrusion) is particularly important for certain applications (window frames and door frames).

Component A

Any of the styrene-acrylonitrile copolymers that are known to the person skilled in the art and disclosed in the literature can in principle be used as component A. For the purposes of the present invention, the term styrene-acrylonitrile copolymer also includes ring-alkylated styrene-acrylonitrile copolymer. Component A is often an SAN matrix.

Quantities of component A used in the molding compositions are from 40 to 55% by weight, preferably from 40 to 50% by weight, often from 44 to 52% by weight, and in particular from 45 to 50% by weight.

Suitable monomers A1 for the copolymer are vinylaromatic monomers, preferably styrene and/or styrene derivatives, preferably α-methylstyrene, and ring-alkylated styrenes, for example p-methylstyrene and/or tert-butylstyrene. Monomers A2 that can be used for the copolymer are by way of example the following compounds: acrylonitrile, methacrylonitrile, methyl acrylate, ethyl acrylate, propyl acrylate, methyl methacrylate, ethyl methacrylate, phenylmaleinimide, acrylamide, vinyl methyl ether. It is preferable to use acrylonitrile.

Component A can be produced by well-known methods as are described by way of example in DE-A 31 49 358, p. 9, lines 18 to 32 and DE-A 32 27 555, p. 9, lines 18 to 32, for example via well-known copolymerization of A1, A2, and optionally other copolymerizable monomers in bulk, solution, suspension, or aqueous emulsion at conventional temperatures and pressures in known apparatuses (source: Kunststoff-Handbuch [Plastics handbook], Vieweg-Daumiller, volume V (Polystyrol [Polystyrene]), Carl-Hanser-Verlag, Munich 1969, p. 124, lines 12 ff.)

Component B

Quantities of component B used are from 0 to 40% by weight, preferably from 0 to 30% by weight, often from 0 to 15% by weight, also sometimes from 10 to 30% by weight, and in particular from 12 to 24% by weight.

Monomers that can be used for the production of the base stage (graft core) are butadiene and also alkyl acrylate usually having from 1 to 8 carbon atoms, particularly preferably from 4 to 8 carbon atoms in the alkyl moiety, in particular n-butyl acrylate and/or ethylhexyl acrylate. The acrylates can be used individually or in a mixture in the production of the graft base B1.

A suitable crosslinking agent is allyl (meth)acrylate, in particular allyl methacrylate. It is optionally possible to use up to 2% by weight, preferably up to 1% by weight, and in particular up to 0.5% by weight, of other copolymerizable monomers having at least two functional groups. Suitable monomers are by way of example those comprising two or more ethylenically double bonds which are capable of copolymerization and are not conjugated in 1,3-position. Examples of suitable crosslinking monomers are divinylbenzene, diallyl maleate, diallyl fumarate, and/or diallyl phthalate, triallyl cyanurate, allyl (meth)acrylate, and preferably the acrylic ester of tricyclodecenyl alcohol, and/or dicyclopentadienyl acrylate.

Examples of possible other copolymerizable monomers that can be used are the following compounds: alpha-methylstyrene, methacrylonitrile, methyl acrylate, ethyl acrylate, propyl acrylate, methyl methacrylate, ethyl methacrylate, phenyl maleinimide, acrylamide, vinyl methyl ether.

Suitable vinylaromatic monomers B21 for the production of the shell(s) B2 grafted onto the graft base B1 are preferably styrene and/or styrene derivatives, e.g. styrene, alkylstyrenes, preferably α-methylstyrene, and ring-alkylated styrenes, e.g. p-methylstyrene and/or tert-butylstyrene.

Examples of polar copolymerizable unsaturated monomers for B2 are acrylonitrile and methacrylonitrile.

Possible other monomers, in particular copolymerizable monomers, that can be used, in particular for B2, are by way of example the following compounds: acrylic acid, methacrylic acid, maleic anhydride, methacrylonitrile, methyl acrylate, ethyl acrylate, propyl acrylate, methyl methacrylate, ethyl methacrylate, phenylmaleinimide, acrylamide, vinyl methyl ether. These can by way of example be used alone as grafted shell B2, or particularly preferably as copolymer in vinylaromatic monomers B21.

The conventional auxiliaries and/or conventional additional substances can moreover be used in the molding compositions, examples being emulsifiers, such as alkaline metal salts of alkyl- or alkylarylsulfonic acids, alkyl sulfates, fatty alcohol sulfonates, salts of higher fatty acids having from 10 to 30 carbon atoms, or resin soaps, polymerization initiators, e.g. conventional persulfates, for example potassium persulfate, or known redox systems, polymerization auxiliaries, e.g. conventional buffer substances which can adjust pH to, preferably, from 6 to 9, e.g. sodium bicarbonate and/or sodium pyrophosphate, and/or molecular weight regulators, for example mercaptan, terpinols, and/or dimeric α-methylstyrene, where the usual quantity used of the molecular weight regulators, based on the weight of the reaction mixture, is from 0 to 3% by weight.

The production of the ASA (acrylate-styrene-acrylonitrile) material of the invention, comprising the elastomeric graft base B1 made of acrylate polymer and the graft shell B2 made of styrene-acrylonitrile copolymer, is well known from the technical literature and is described by way of example in DE-A 12 60 135, pp. 3 to 4, lines 13 to 23 and U.S. Pat. No. 3,055,859, pp. 2 to 4, lines 62 to 10, and also in relation to grafting in two stages in DE-A 31 49 358, pp. 6 to 8, lines 16 to 5 and DE-A 32 27 555, pp. 6 to 8, lines 16 to 5. In a possible method here, the rubbery acrylate polymer serving as graft base A21 is by way of example initially produced via emulsion polymerization of A211 by, for example, polymerizing A211 and the at least bifunctional crosslinking agent, for example in aqueous emulsion, in a manner known per se at temperatures of from 20 to 100° C., preferably from 50 to 80° C. A mixture of vinylaromatic monomers A221 with a polar copolymerizable unsaturated monomer A222, and also optionally A223, can be grafted onto this resultant polyacrylate latex, the graft copolymerization reaction here likewise preferably being carried out in aqueous emulsion.

The elastomeric component B1 can also, as described in EP 534,212 B1, pp. 4 to 5, lines 46 to 43, be grafted onto a hard core which is composed of the monomers mentioned for A1 and optionally has been crosslinked with the monomers mentioned for A1. It is preferable that this is a hard core with a glass transition temperature Tg>25° C., where the proportion of the core is, as already described, from 5 to 50% by weight, based on the weight of A1.

Alternatively, the elastomeric base B1 can be composed of diene monomers, preference being given here to use of butadiene and isoprene, in particular butadiene, optionally in conjunction with other monomers such as styrene.

In another particularly preferred embodiment, the grafting can be achieved in two stages as in DE-A 31 49 358, pp. 6 to 8, lines 16 to 5 or DE-A 32 27 555, pp. 6 to 8, lines 1 to 5, where the vinylaromatic monomer can be polymerized first in the presence of the graft base. The graft copolymerization reaction can then be carried out in the second stage with a mixture comprising at least one vinylaromatic monomer and at least polar copolymerizable monomer. The quantities of the various components used and present in the ASA materials have already been described in the introduction.

In order to obtain the ASA materials with good mechanical properties, the polyacrylate serving as graft base is crosslinked, i.e. it is produced via polymerization of acrylates in the presence of at least bifunctional, crosslinking monomers.

The thermoplastic molding composition can preferably comprise from 0.5 to 30% by weight, often from 0.5 to 15% by weight, of at least one graft polymer as component B, composed of:
  a) from 10 to 90% by weight of graft base B1 made of (partially) crosslinked polybutadiene or polyacrylate,
  b) from 90 to 10% by weight of one or more graft coatings B2 made of styrene, acrylonitrile, and optionally other monomers such as methyl methacrylate (MMA).

In another embodiment, up to 50% by weight of one or more components B can be added as impact modifier to the thermoplastic molding composition in order to improve mechanical properties. In particular, component B can at least partially replace component A in the thermoplastic molding composition (see examples 2.3 and 2.4).

The invention also provides molding compositions comprising (or consisting of):

A) from 20 to 25% by weight of a styrene-acrylonitrile copolymer and/or of an α-methylstyrene-acrylonitrile copolymer as component A,
B) from 10 to 25% by weight of a graft polymer as component B,
C) from 0.1 to 10% by weight of a compatibilizer as component C,
D) from 40 to 60% by weight of glass fibers as component D,
E) from 0 to 5% by weight of other components E, where the entirety of components A, B, C, and D, and E preferably gives precisely 100% by weight. In particular, the entirety of components A and B here is in the range from 42 to 50% by weight.

Component C

Quantities of component C often used are from 0.1 to 10% by weight, preferably from 1 to 10% by weight, and in particular from 2 to 5% by weight. The component is preferably a copolymer.

The thermoplastic molding compositions that can be produced by the processes of the invention comprise, as component C, one or more compatibilizers. Those compatibilizers suitable for styrene copolymer-glass fiber mixtures are known in principle to the person skilled in the art and are described in the literature.

Components C that can be used with preference as compatibilizers are (meth)styrene-acrylonitrile-maleic anhydride copolymers. These often comprise, based on the entire component C, from 0.5 to 5% by weight of maleic-anhydride-derived units. It is preferable that this maleic anhydride content is from 1 to 3% by weight, in particular form 2.0 to 2.2% by weight.

It is particularly preferable that component C is a styrene-acrylonitrile-maleic anhydride terpolymer. The proportion of acrylonitrile in the terpolymer, based on the entire terpolymer, is preferably from 10 to 30% by weight, particularly preferably from 15 to 30% by weight, in particular from 20 to 25% by weight. The remainder is made up by styrene and MA.

The maleic-anhydride-containing (methyl)styrene-acrylonitrile copolymers that can preferably be used generally have molar masses Mw in the range from 30 000 to 500 000 g/mol, preferably from 50 000 to 250 000 g/mol, in particular from 70 000 to 200 000 g/mol, determined via GPC with use of tetrahydrofuran (THF) as eluent, and with polystyrene calibration. It is preferable that the terpolymer described in the experimental section is used as component C.

Component D

Quantities of component C used are from 40 to 55% by weight, preferably from 42 to 55% by weight, and in particular from 45 to 55% by weight. The thermoplastic molding compositions of the invention that can be produced comprise glass fibers as component D. Production of the glass fibers D is known to the person skilled in the art and is described in the literature. Any of the types of glass available in industry can be used as glass fibers. A description of suitable glass fibers is found by way of example in Milewski, J. V., Katz, H. S. "Handbook of Reinforcements for Plastics", pp. 233 ff., Van Nostrand Reinholt Company Ine, 1987.

For the purposes of another embodiment of the molding composition of the invention, the length of the glass fibers is ≤50 mm. These can by way of example be short glass fibers or long glass fibers, or continuous-filament glass fibers.

Preferred lengths of the glass fibers D, in particular in the finished component (i.e. after production and shaping of the molding composition), are in the range from 0.1 mm to 50 mm, in particular from 0.1 mm to 10 mm, often from 0.1 to 1.0 mm, also from 0.2 to 0.9 mm. The choice of the fiber length of the glass fibers that are used also depends on the method of incorporation, described below, into the plastic. In the case of production of moldings via press molding, there is by way of example no restriction on the fiber length. In moldings produced via injection molding, the average length of the glass fibers is preferably in the range from 0.1 to 2 mm. By virtue of the combination of the glass fiber together with components A and C, it is advantageously possible to achieve relatively high stiffness of the molding composition, since the length of the fibers is more than 150 µm.

The diameters of the glass fibers D are usually in the range from 0.1 to 300 µm, preferably from 1 to 100 µm, particularly preferably from 3 to 50 µm, very particularly preferably from 5 to 30 µm. In the case of glass fiber strands or glass fiber bundles, e.g. rovings, the diameters mentioned are based on the diameters of the individual glass fibers (often also termed "individual filaments") in these strands or bundles. Not only is it possible to use the glass fibers C in the form of individual fibers, of strands, or of bundles: they can also in principle be used in the form of, for example, mats, woven fabrics, or nonwovens. The glass fibers C can by way of example be composed of A, E, C, ECR, D, R, M, or S glass (see DIN 1259: 2001-09 [Glas; Teil 1] [Glass; Part 1]).

The glass fibers C can be provided with a size, for example a polyurethane size, a titanate size, or in particular a size made of silane compounds, which improves the compatibility of the fiber with the thermoplastic matrix M. Examples of silane compounds suitable as size are those of the formula I

where
X is $NH_2$—,

HO—
n is an integer from 2 to 10, preferably 3 or 4
m is an integer from 1 to 5, preferably 1 or 2
k is an integer from 1 to 3, preferably 1.

Preferred silane compounds are aminopropyltrimethoxysilane, aminobutyltri-methoxysilane, aminopropyltriethoxysilane, aminobutyltriethoxysilane, and also the corresponding silanes which comprise a glycidyl group instead of $NH_2$— as substituent X.

If sizes are used, the proportion of the size is generally from 0.05 to 5% by weight, based on the weight of the glass fibers C.

For the purposes of another embodiment of the molding composition of the invention, component A is replaced at least to some extent with polyvinyl chloride.

In particular, in order to improve mechanical properties it is possible to add up to 50% by weight, preferably up to 30% by weight, and in particular up to 20% by weight, of one or more types of PVC. This can advantageously give better adhesion of the molding composition of the invention to another PVC component.

For the purposes of another embodiment of the molding composition of the invention, component A is a styrene-acrylonitrile copolymer with from 65 to 76% by weight styrene content. In particular, component A can be an SAN polymer with an S/AN ratio of 67/33 and intrinsic viscosity 80 dl/g (measured on a 0.5% solution in DMF at 23° C.).

For the purposes of another embodiment of the molding composition of the invention, component C comprises one or more (methyl)styrene-acrylonitrile copolymers which comprise, based on the entire component C, from 0.5 to 5% by weight of maleic-anhydride-derived units.

Further Components E

For the purposes of another embodiment, the molding composition of the invention comprises from 0.01 to 5% by weight of at least one other component E, in particular in the form of auxiliary and/or of additional substance. Quantities of component E used are from 0.01 to 5% by weight, preferably from 0.025 to 2% by weight, and in particular from 0.05 to 1.5% by weight. The component can comprise an individual constituent or a plurality of constituents.

The mixtures of the invention can preferably comprise auxiliaries and/or additional substances in addition to (A) to (D). Particular preference is given in the invention to mixtures comprising up to 5% by weight of auxiliaries and/or additional substances. Examples of auxiliaries and/or additional substances that can be used are light stabilizers and other stabilizers, plasticizers, antistatic agents, lubricants, blowing agents, other compatible thermoplastics, for example polyesters (e.g. polyethylene terephthalate, polybutylene terephthalate), polycarbonate, polyamide, polyoxymethylene, polystyrene, polyethylene, polypropylene, polyvinyl chloride, fillers, surface-active substances, flame retardants, dyes, and pigments.

The materials preferably comprise quantities of from 0.1 to 5% by weight of the stabilizers with respect to oxidation, hydrolysis, light, heat or discoloration. The materials often comprise two different types of stabilizer.

For the purposes of another embodiment of the molding composition of the invention, component E comprises a light stabilizer, a lubricant, and a (medicinal) white oil. In particular, component E can be composed of a plurality of substances, in order by way of example to influence the appearance of the molding composition. To this end, the material can preferably comprise optical brighteners, free-radical scavengers, which scavenge free radicals generated by UV radiation within the molding composition, or light stabilizers.

Lubricants and mold-release agents, quantities of up to 1% by weight of which can generally be added, are stearic acid, stearyl alcohol, alkyl stearates, and stearamides, and also esters of pentaerythritol with long-chain fatty acids. It is also possible to use stearic salts of calcium, of zinc, or of aluminum, and also dialkyl ketones, e.g. distearyl ketone. In particular, calcium stearate is suitable in the invention.

Light stabilizers that can be used are any of the conventional light stabilizers, for example compounds based on benzophenone, on benztriazole, on cinnimic acid, on organic phosphites and phosphonites; it is also possible to use sterically hindered amines.

Examples of lubricants that can be used are hydrocarbons such as oils, paraffins, PE waxes, PP waxes, fatty alcohols having from 6 to 20 carbon atoms, ketones, carboxylic acids such as fatty acids, montanic acid, or oxidized PE wax, carboxamides, and also carboxylic esters, e.g. with the following alcohols: ethanol, fatty alcohols, glycerol, ethanediol, pentaerythritol, and with long-chain carboxylic acids as acid component.

Stabilizers that can be used are conventional antioxidants, for example phenolic antioxidants, e.g. alkylated monophenols, esters and/or amides of β-(3,5-di-tert-butyl-4-hydroxyphenyl)propionic acid, and/or benztriazoles. Possible antioxidants are mentioned by way of example in EP-A 698637 and EP-A 669367. Specifically, mention may be made of the phenolic antioxidants 2,6-di-tert-butyl-4-methylphenol, pentaerythritol tetrakis-[3-(3,5-di-tert-butyl-4-hydroxyphenyl)]propionate, and N,N'-di-(3,5-di-tert-butyl-4-hydroxyphenylpropionyl)hexamethylenediamine. The stabilizers mentioned can be used individually or in mixtures. The stabilizer Tinuvin 770 has proven to be particularly suitable, often in combination with another stabilizer (see experimental section). Tinuvin 770 is a low-molecular-weight dicarboxylic ester with the systematic name: bis(2,2,6,6-tetramethyl-4-piperidinyl) decanedioate. A suitable material in combination is by way of example Cyasorb UV-3853 (see Hostavin N845N), a mixture of low-molecular-weight fatty esters with a heterocyclic alcohol (C12-21 and C18-unsaturated-2,2,6,6-tetramethyl-4-piperidinyl ester). Another suitable material is Chimassorb 944 (HALS-HS-944), a mixture of oligomeric HALS stabilizers with the molecular formula $(C_{35}H_{68}N_8)_n$ having various chain lengths (poly[[6-[(1,1,3,3-tetra-methylbutyl)amino]-s-triazine-2,4-diyl]-[(2,2,6,6-tetramethyl-4-piperidyl)imino]-hexa-methylene-[(2,2,6,6-tetramethyl-4-piperidyl)imino]).

The mixtures of the invention can by way of example be pelletized or granulated, or processed by well-known processes, for example via extrusion, injection molding or calendering, to give cable sheathing, foils, hoses, fibers, profiles, shoe shells, soles, technical molded parts, consumer items, blowmoldings or other moldings of any type, coatings, folding bellows, and/or animal ear tags.

The present invention also provides a process for the production of the thermoplastic molding composition of the invention, where the thermoplastic molding composition is produced by mixing of components A, B, C, and D and E in the melt.

In another embodiment, the present invention describes a process for the production of styrene polymers with glass fiber content of more than 40% by weight, characterized in that the length of the glass fibers is less than 5 mm, preferably less than 2 mm, and particularly preferably less than 0.5 mm, the quantity of glass fibers is more than 40% by weight—based on 100% by weight of entire molding composition—and comprises more than 1% by weight, preferably more than 2% by weight and particularly preferably more than 3% by weight of a styrene-acrylonitrile-MA-based copolymer.

In another embodiment of the process of the invention, components A, C, D, E, and optionally B, are compounded. A compounding (polymer compounding) process can be carried out here via admixture of additional substances (fillers, additives, etc.) for targeted optimization of property profiles. In particular, component E can be used for this purpose. Components A, B, C, and D can be used simultaneously or in succession. For the purposes of the present invention, the expression "in succession" means that by way of example two components are initially mixed and then the other components are added to this mixture. The compounding process takes place mainly in extruders (primarily corotating twin-screw extruders, or else counterrotating twin-screw extruders and co-kneaders), and comprises the process operations of conveying, melting, dispersion, mixing, devulcanization, and pressurization.

The invention also provides the use of the thermoplastic molding composition of the invention for the production of window profiles, door profiles, leaf profiles, or frame profiles. Thermoplastic molding compositions preferably used, and preferred processes, have been listed above.

The invention is described in more detail in the examples below and in the claims.

EXAMPLE 1

The SAN-copolymer molding compositions were compounded in a compounding extruder with various concentrations of glass fiber.
Machine: ZSK40 with GF-metering unit
Melt temperature: 250° C.
Throughput: from 20 to 50 kg/h
Component A (SAN polymer): S/AN ratio 67/33, intrinsic viscosity: 80 dl/g (measured on a 0.5% solution in DMF at 23° C.)
Component C (anhydride-containing copolymer): S/AN/MA copolymer with 3% by weight of MA, 22% by weight of AN, and 75% by weight of S, intrinsic viscosity: 80 dl/g (measured on a 0.5% solution in DMF at 23° C.)
Component D (glass fibers):
By way of example CRATEX 183F-11P glass fibers (length of glass fibers 250 μm)

| Component | Experiment 1 | Comparative experiment 1 | Comparative experiment 2 | Comparative experiment 3 | Comparative experiment 4 |
|---|---|---|---|---|---|
| A | 46 | 60 | 50 | 36 | 26 |
| B | 0 | 0 | 0 | 0 | 0 |
| C | 4 | 0 | 0 | 4 | 4 |
| D | 50 | 40 | 50 | 60 | 70 |
| Granulated material, visual evaluation | Good | Good | Continuous compounding not possible, granulated material not homogeneous | Continuous compounding difficult | Continuous compounding not possible, granulated material not homogeneous |
| Modulus of elasticity (GPa) | 16 | 12 | 15-18 | 20 | |

EXAMPLE 2 Further Improvement of Mechanical Properties

Component A: S/AN ratio 67/33, intrinsic viscosity: 80 dl/g (by way of example commercially available product: LURAN 3380 Natural color)
Component B (R-1):
Graft rubber composed of:
62% by weight of a graft base made of 100% by weight of butadiene
38% by weight of a graft coating made of S/AN (70/30)
Component B (R-2):
Graft rubber composed of:
60% by weight of a graft base made of 98% by weight of butyl acrylate and 2% by weight of an acrylate of tricyclodecenyl alcohol
40% by weight of a graft coating made of S/AN (75/25)
Component C: terpolymer made of S/AN/MA 75/22/3 with IV=80 dl/g (by way of example COMP VT 2421)
Component D: glass fiber (e.g. Cratex 183F-11P)
Components E: additives, in particular stabilizers (by way of example Tinuvin 770 or a combination of two stabilizers (with Tinuvin 770)).

EXAMPLE 2

| | |
|---|---|
| Component A | 46 |
| Component B | 0 |
| Component D | 50 |
| (CRATEX 183F-11P) | |
| Component C | 4 |

EXAMPLE 3

The molding composition was produced by analogy with example 2 but with 15% by weight of rigid PVC (and a correspondingly smaller quantity of SAN, component A).

An additional increase of mechanical strength was observed.

EXAMPLE 4

The molding composition was produced by analogy with example 2 but additionally with 12% by weight of graft rubber component B (R-1) (polybutadiene-based).

| | |
|---|---|
| Component A | 34 |
| Component B (R-1) | 12 |
| Component D | 50 |
| (CRATEX 183F-11P) | |
| Component C | 4 |

EXAMPLE 5

The molding composition was produced by analogy with example 2 but with 12% of additional component B (R-2)

| | |
|---|---|
| Component A | 34 |
| Component B (R-2) | 12 |
| Component D | 50 |
| (CRATEX 183F-11P) | |
| Component C | 4 |

Results of Experiments:

| Experiment: | 2 | 3 | 4 | 5 |
|---|---|---|---|---|
| Insertion of a screw thread through a hole of diameter 3 mm | Cracks | Does not crack | Does not crack | Does not crack |

What is claimed is:

1. A thermoplastic molding composition consisting of:
   A) from 40 to 50% by weight of a styrene-acrylonitrile copolymer with from 65 to 76% by weight styrene content and with from 35 to 24% by weight acrylonitrile content as component A,
   B) from 0 to 15% by weight of a graft polymer as component B comprising:
      B1: a graft base composed of an alkyl acrylate, of an allyl (meth)acrylate, of a copolymerizable monomer, and/or of a diene monomer,
      B2: at least one graft shell composed of at least one vinylaromatic monomer and/or copolymerizable monomer,
   C) from 0.1 to 10% by weight of a compatibilizer as component C, where component C is a styrene-acrylonitrile-maleic anhydride terpolymer, where the proportion of acrylonitrile in the terpolymer, based on the entire terpolymer, is from 20 to 25% by weight,
   D) from 40 to 55% by weight of glass fibers as component D,
   E) from 0 to 10% by weight of other components,
   where the entirety of components A, B, C, D, and E gives 100% by weight.

2. The thermoplastic molding composition as claimed in claim 1, consisting of:
   A) from 40 to 50% by weight of a styrene-acrylonitrile copolymer as component A,
   B) from 0 to 15% by weight of a graft polymer as component B comprising:
      B1: a graft base composed of an alkyl acrylate, of an allyl (meth)acrylate, of a copolymerizable monomer, and/or of a diene monomer,
      B2: at least one graft shell composed of at least one vinylaromatic monomer and/or copolymerizable monomer,
   C) from 0.5 to 8% by weight of a compatibilizer as component C,
   D) from 40 to 50% by weight of glass fibers as component D,
   E) from 0.1 to 4% by weight of stabilizer(s) as component E,
   where the entirety of components A, B, C, D, and E gives 100% by weight.

3. The thermoplastic molding composition as claimed in claim 1, consisting of:
   A) from 40 to 50% by weight of a styrene-acrylonitrile copolymer as component A,
   B) from 0 to 15% by weight of a graft polymer as component B comprising:
      B1: a graft base composed of an alkyl acrylate, and/or butadiene,
      B2: at least one graft shell composed of styrene and/or acrylonitrile,
   C) from 0.5 to 8% by weight of a compatibilizer as component C,
   D) from 40 to 50% by weight of glass fibers as component D,
   E) from 0.1 to 4% by weight of stabilizer(s) as component E,
   where the entirety of components A, B, C, D, and E gives 100% by weight.

4. The thermoplastic molding composition as claimed in claim 1, consisting of:
   from 40 to 50% by weight of a styrene-acrylonitrile copolymer as component A,
   C) from 0.5 to 8% by weight of a compatibilizer as component C,
   D) from 40 to 50% by weight of glass fibers as component D,
   E) from 0.1 to 4% by weight of stabilizer(s) as component E,
   where the entirety of components A, C, D, and E gives 100% by weight.

5. The thermoplastic molding composition as claimed in claim 1, where the length of the glass fibers (component D) is ≤50 mm.

6. The thermoplastic molding composition as claimed in claim 1, where component C is composed of one or more copolymers, and where component C comprises at least one styrene-acrylonitrile-maleic anhydride copolymer which comprises from 0.5 to 5% by weight of maleic-anhydride-derived units.

7. The thermoplastic molding composition as claimed in claim 1, comprising, as component E, from 0.05 to 5% by weight of at least two stabilizers.

8. The thermoplastic molding composition as claimed in claim 1, comprising, as component E, a lubricant and a medicinal white oil.

9. A process for the production of a thermoplastic molding composition, wherein in the thermoplastic molding composition consists of:
   A) from 40 to 50% by weight of a styrene-acrylonitrile copolymer with from 65 to 76% by weight styrene content and with from 35 to 24% by weight acrylonitrile content as component A,
   B) from 0 to 15% by weight of a graft polymer as component B comprising:
      B1: a graft base composed of an alkyl acrylate, of an allyl (meth)acrylate, of a copolymerizable monomer, and/or of a diene monomer,
      B2: at least one graft shell composed of at least one vinylaromatic monomer and/or copolymerizable monomer,
   C) from 0.1 to 10% by weight of a compatibilizer as component C, where component C is a styrene-acrylonitrile-maleic anhydride terpolymer, where the proportion of acrylonitrile in the terpolymer, based on the entire terpolymer, is from 20 to 25% by weight,
   D) from 40 to 55% by weight of glass fibers as component D,
   E) from 0 to 10% by weight of other components,
   where the entirety of components A, B, C, D, and E gives precisely 100% by weight;
   the step of mixing the components in a melt.

* * * * *